United States Patent
Venkatesan et al.

(10) Patent No.: US 11,348,149 B2
(45) Date of Patent: May 31, 2022

(54) SYSTEM AND METHOD FOR IDENTIFICATION AND PREDICTION OF POSITIVE BUSINESS LEADS THROUGH LEAD SCORING

(71) Applicant: Freshworks, Inc., San Bruno, CA (US)

(72) Inventors: Srivatsan Venkatesan, Puzhuthivakkam (IN); Tarkeshwar Thakur, Bangalore (IN); Vijayaragavan Venkatarathinam, Madipakkam (IN); Bhagirath Goud, Mahabubnagar (IN); Pratheeswaran Ramasamy, Madipakkam (IN)

(*) Notice: Subject to any disclaimer, the term of this patent is extended or adjusted under 35 U.S.C. 154(b) by 573 days.

(21) Appl. No.: 15/688,812

(22) Filed: Aug. 28, 2017

(65) Prior Publication Data
US 2018/0060929 A1    Mar. 1, 2018

(30) Foreign Application Priority Data
Aug. 30, 2016 (IN) .............................. 201641029617

(51) Int. Cl.
*G06Q 30/00* (2012.01)
*G06Q 30/06* (2012.01)
*G06Q 20/40* (2012.01)

(52) U.S. Cl.
CPC ......... *G06Q 30/0609* (2013.01); *G06Q 20/40* (2013.01); *G06Q 30/0623* (2013.01)

(58) Field of Classification Search
CPC . G06Q 30/0609; G06Q 30/0623; G06Q 20/40
USPC .............................................. 705/26.1–27.2
See application file for complete search history.

(56) References Cited

U.S. PATENT DOCUMENTS

| | | | |
|---|---|---|---|
| 7,467,131 B1* | 12/2008 | Gharachorloo | ..... G06F 16/9574 |
| 8,156,206 B2 | 4/2012 | Kiley et al. | |
| 8,234,272 B2 | 7/2012 | Kretz et al. | |
| 8,544,075 B2 | 9/2013 | Ranjan et al. | |
| 2011/0179025 A1 | 7/2011 | Chuang | |
| 2012/0209586 A1 | 8/2012 | Mieritz et al. | |
| 2013/0339082 A1 | 12/2013 | Kazmaier et al. | |
| 2014/0019409 A1 | 1/2014 | Tseng et al. | |
| 2015/0154617 A1* | 6/2015 | DiPietro | ............ G06Q 30/0201 705/7.29 |
| 2016/0217476 A1* | 7/2016 | Duggal | .............. G06Q 30/0201 |

FOREIGN PATENT DOCUMENTS

WO    2013103955 A1    7/2013

OTHER PUBLICATIONS http://www.intuital.com/.
Ying Li, et al., "Research on Customer Segmentation Based on a Two-Stage SOM Clustering Algorithm", Business School, East China University of Science and Technology, IEEE 2009, 978-1-4244-4639-1/09.

* cited by examiner

*Primary Examiner* — Anand Loharikar
(74) *Attorney, Agent, or Firm* — LeonardPatel PC

(57) ABSTRACT

A computer program, computer-implemented process, and/or an apparatus may detect an event in a webpage or an application, and adjust a lead score by comparing the event with implicit lead scoring rules, explicit lead scoring rules, lead state, or any combination thereof. Using the lead score, the event is assigned to a category or classification for purposes of identifying a positive or negative lead.

20 Claims, 9 Drawing Sheets

500

600

800

SYSTEM AND METHOD FOR IDENTIFICATION AND PREDICTION OF POSITIVE BUSINESS LEADS THROUGH LEAD SCORING

CROSS REFERENCE TO RELATED APPLICATION

This application claims the benefit of, and priority to, Indian Provisional Patent Application No. 201641029617 filed Aug. 30, 2016. The subject matter of this earlier-filed application is hereby incorporated by reference in its entirety.

FIELD

The present invention generally relates to identifying and predicting positive business leads, and more specifically, identifying and predicting positive business leads by way of lead scoring.

BACKGROUND

Since the conception of the Internet, leads have become increasing relevant for purchasing and selling data regarding a potential consumer. For example, inbound marketing attracts a high volume of leads by way of the Internet. This provides a real challenge to filter data, i.e., filter quality leads from non-quality leads. Quality leads may be defined as those that are more likely to convert into customers, while non-quality leads may be defined as those that are less likely to convert into customers.

Currently, there are no systems or methods that filter data, and more specifically, identify or predict quality leads using predictive lead scoring. Instead, sales agents focus their energy and time on leads without any predictive data. More specifically, the current approach for lead scoring is reactive in nature rather than predictive. The lack of predictive data results in lower conversion of leads to actual sales.

Further, there is a lack of an integrated customer relationship management (CRM) platform that combines the functionalities of standalone CRM products. For example, users of a CRM platform regularly need to use add-ons over CRMs for phone, email, tracking events and lead scoring. An integrated CRM can allow an exhaustive and deeper version of these functionalities.

Thus, an alternative process for filtering lead data, i.e., identifying and predicting quality of leads, may be beneficial.

SUMMARY

Certain embodiments of the present invention may provide solutions to the problems and needs in the art that have not yet been fully identified, appreciated, or solved by conventional lead scoring systems. For example, some embodiments pertain to a process for filtering lead data by scoring leads, and more specifically, to identifying and predicting positive leads that are converted to sales by ranking all leads based on predefined parameters or dynamic parameters.

In an embodiment, a computer program is embodied on a non-transitory computer-readable medium. The computer program is configured to cause at least one processor to detect an event in a webpage or an application, and adjust a lead score by comparing the event with implicit lead scoring rules, explicit lead scoring rules, or any combination thereof. The computer program is further configured to cause at least one processor to assign a lead to a category or classification by using the adjusted lead score for purposes of identifying a positive or negative lead.

In another embodiment, a computer program is embodied on a non-transitory computer-readable medium. The computer program is configured to cause at least one processor to assign or adjust a score to one or more leads based on an event, wherein the event is triggered by a user of a computing system, and rank the one or more leads based on a profile of the one or more leads and an engagement level of the one or more leads with a company. The computer program is further configured to cause the at least one processor to filter one or more lower quality leads to identify one or more sales ready leads.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Figure 1:
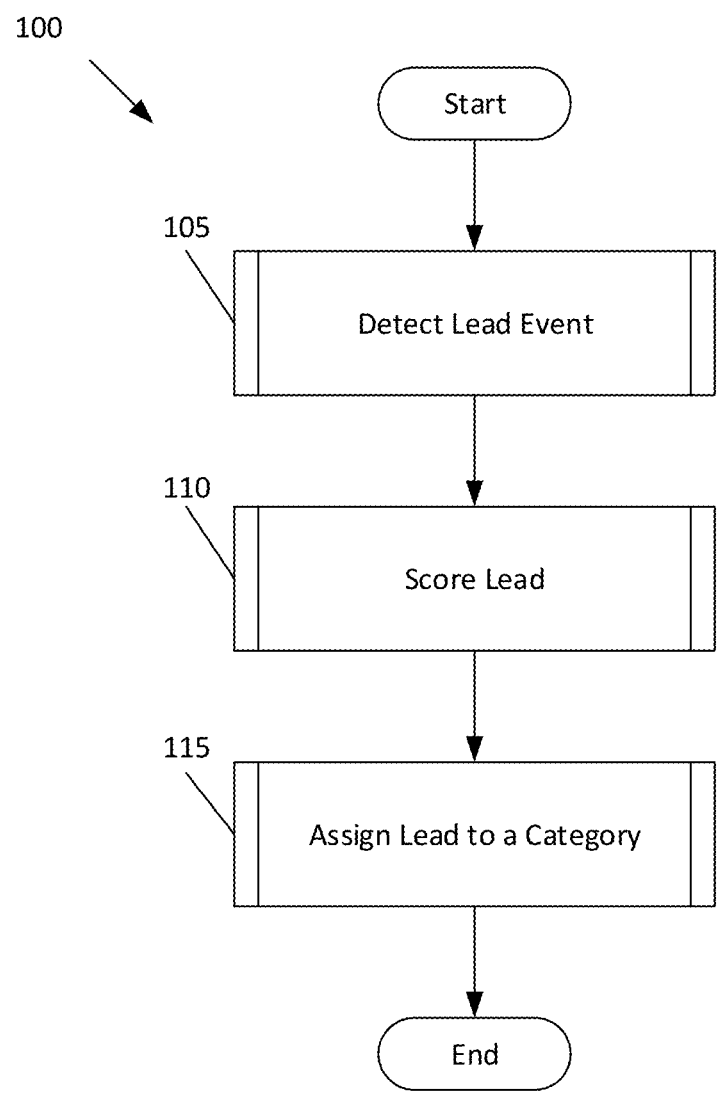
FIG. 1 is a flow diagram illustrating a process for classifying leads, according to an embodiment of the present invention.

Some embodiments of the present invention may identify sales ready leads by way of a lead scoring process. In an embodiment, the process may assign a score to leads and rank the leads based on a profile of the leads and an engagement level of the leads with the company. Profile of the leads may be defined as attributes of the person and/or the company represented by the lead, e.g., location, industry type, employee strength, and revenue. Engagement level may be defined as a function of metrics observed from the user's product usage, e.g., pages visited and emails replied.

By using this process, lower quality leads may be filtered, allowing sales agents to focus their efforts on better quality leads, and also, improving the conversion rate of the leads into sales.

In some embodiments, rules may be created based on criteria of a good lead versus a bad lead. Criteria of a good lead may include, but is not limited to, belonging to a particular territory and industry type and falling in a particular revenue range. That lead may exhibit a high level of product engagement. A score may be assigned to the leads, when the leads satisfy the created rules. This allows for ranking of the leads according to quality, improving the conversion rate of the leads.

In some embodiments, there may be different approaches to lead scoring. This may include explicit lead scoring, implicit lead scoring, predictive lead scoring, intelligent lead scoring, and behavior and activity based lead score.

Under explicit lead scoring, predefined rules may be created to influence the score of a lead. These rules may include lead property, email activity, application activity, web activity, etc. Lead property may include default fields in the lead form such as job title, geographic location, industry type, deal expected close date, and any custom fields configured to the lead. See FIG. 3. Email activity may include responses to the emails sent from the lead supplier (regardless of whether the email was opened or any linked clicked in the email). See FIG. 4. Application activity may include actions performed on a user's web application and website such as configuring a particular feature, downloading a brochure, signing up for a webinar, and like. See. FIG. 5. For a CRM business, a lead adding users indicates a positive activity, while raising support tickets indicates a negative activity. Web activity may include pages viewed on the website such as pricing page, home page, careers page, and the like. See FIG. 6.

Under implicit lead scoring, lead scoring may dynamically change depending on the event. For example, events that increase the lead score include when an email is opened, when a link within the email is clicked on, when a user visits the website, when the user completes a web-based form belonging to the company, when the user opens pricing details on the website, when the company receives a call from the user, etc. Conversely, events that decrease the lead score include when an unsubscribe button is clicked by the user, user becomes non-responsive, the user declines the phone call from the company, company attempts to reach the user has failed, etc. A non-exhaustive of implicit lead scoring is shown below in Table A.

TABLE A

| Events | Relative weight |
|---|---|
| Email Opened | 10 |
| Email Clicked | 10 |
| Email Bounced | −5 |
| First Email Bounce | −10 |
| Any Event | 1 |
| Webpage Viewed | 1 |
| Pricing/Billing/Purchase Page Viewed | 3 |
| Replied Email | 15 |
| Contact Attempted | 1 |
| Call Duration Greater than 1 Min | 5 |
| Deal Created | 5 |
| Lead Converted | 10 |
| Appointment Created | 3 |
| Task Created | 1 |
| Contact Updated | 1 |
| Deals Updated | 2 |
| Job Title is CXO | 3 |

TABLE A-continued

| Events | Relative weight |
|---|---|
| Pending Deal Greater than N Days | −5 for each N(=10) days |
| When 'Has Authority' is Checked | 2 |
| When 'Do Not Disturb' is Checked | −1 |
| Deal Created For/Linked to a Contact | 10 |
| Task Completed | 2 |

It should be appreciated that the event in Table A is strictly limited to the assigned weights, and may include different weight values depending on the embodiment.

Predictive lead scoring may include collecting data from leads that have converted for the company, and use similarity or dissimilarity of a new lead with past leads in determining the lead score.

FIG. 1 is a flow diagram illustrating a process 100 for classifying leads, according to an embodiment of the present invention. In some embodiments, process 100 may begin at 105 with detecting an event for a lead. The event may be triggered by a customer completing a lead form, accessing a webpage, etc. At 110, a lead score is calculated according to the event. The lead score may be calculated using one or more of the lead scoring approaches described above. At 115, upon calculating of the lead score, the lead is classified into a category. These categories may be defined as hot leads, warm leads, and cold leads. In some embodiments, a hot lead is a lead score that is greater than or equal to 70, a warm lead is a lead score that is less than 70 and greater than or equal to 30, and a cold lead is a lead score that is less than 30.

Lead scores may also be classified into categories such as active leads, inactive leads, and slipping away leads. However, the activity of the lead may be dependent upon the activity of the user (or customer) associated with the lead. For example, if the activity of the user associated with the lead is less than 7 days, the lead may be classified as active. If the activity is more than 7 days, the lead may be classified as slipping away, and if the activity is greater than 30 days, the lead may be classified as inactive. In other words, leads may be classified according to activity increasing the likelihood of upselling or cross-selling to customers that are more active.

Figure 2:
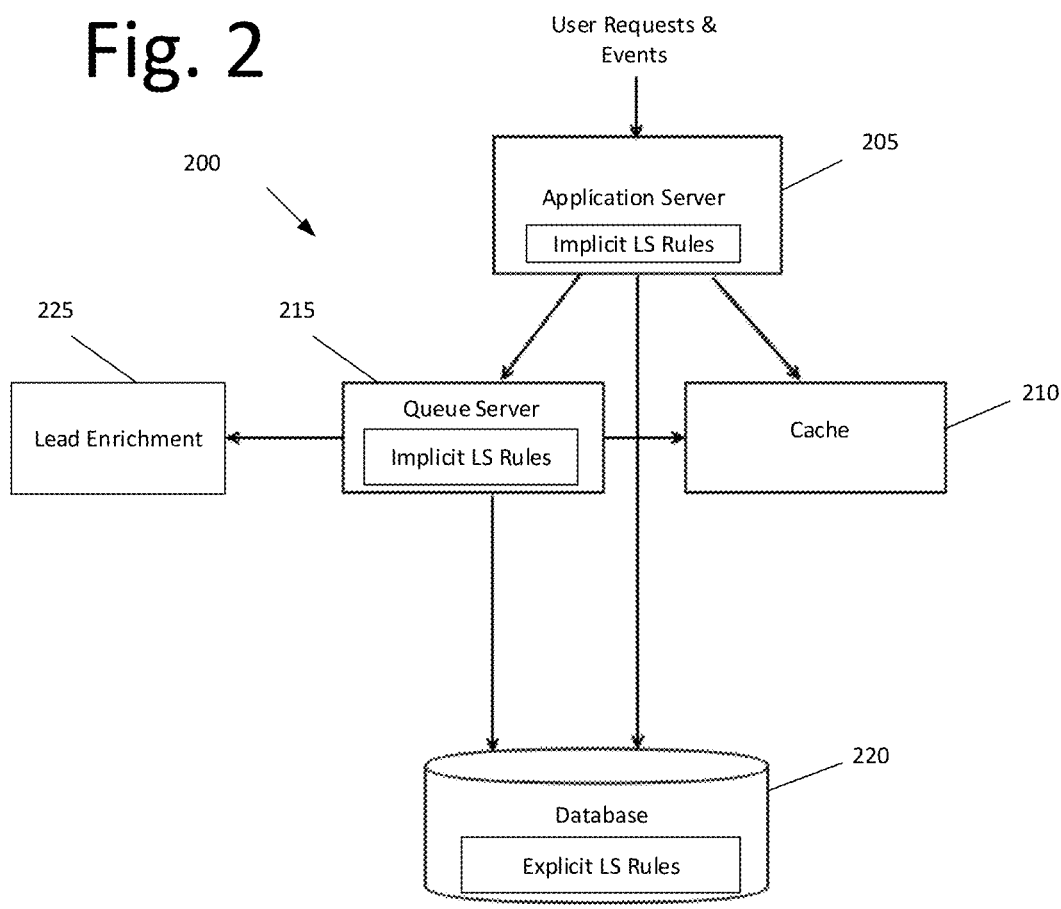
FIG. 2 is a block diagram illustrating a system for classifying leads, according to an embodiment of the present invention.

FIG. 2 is a block diagram illustrating a lead scoring and classification system 200 for classifying leads into a category, according to an embodiment of the present invention. In this embodiment, there are four systems or modules involved in processing lead score rules. For example, database 220 may store explicit lead scoring (LS) rules. These explicit LS rules are entered by users in certain embodiments. Implicit LS rules however are written into the application code itself. The implicit LS rules may be executed by application server 205 and/or queue server 215. Both servers 205 and 215 may use cache 210 for faster execution. For example, in an embodiment, cache 210 may store current leads to help calculate effect of changes being caused by new events faster reducing the need to make queries to database 220.

In some embodiments, when an event is received by application server 205, application server 205 may access the implicit LS rules, explicit LS rules, and/or cached leads to adjust the lead score. This may provide for faster execution of adjusting the lead score.

In an alternative embodiment, queue server 215 may also adjust the lead score by applying explicit LS rules, implicit LS rules, and cached leads, all of which are relevant to the request or the event. Like the above, this may also provide faster execution of adjusting the lead score.

In some embodiments, score changes may take extra time to compute. In these embodiments, score changes are executed on queue server 215, while others score changes that require less computation time are computed on application server 205. Queue server 215 and application server 205 are separate servers, on separate machines, for example.

In this embodiment, lead enrichment 230 is the process of completing fields of a lead. Normally, leads are obtained through a registration process or data import and may have a few fields such as email and name. Under lead enrichment 230, additional attributes of the lead, such as details of the person and company represented by the lead, are provided. Lead scoring rules operate on the enriched leads. Lead enrichment is processed by programs using application program interfaces (APIs) from external services in certain embodiments.

Figure 3:
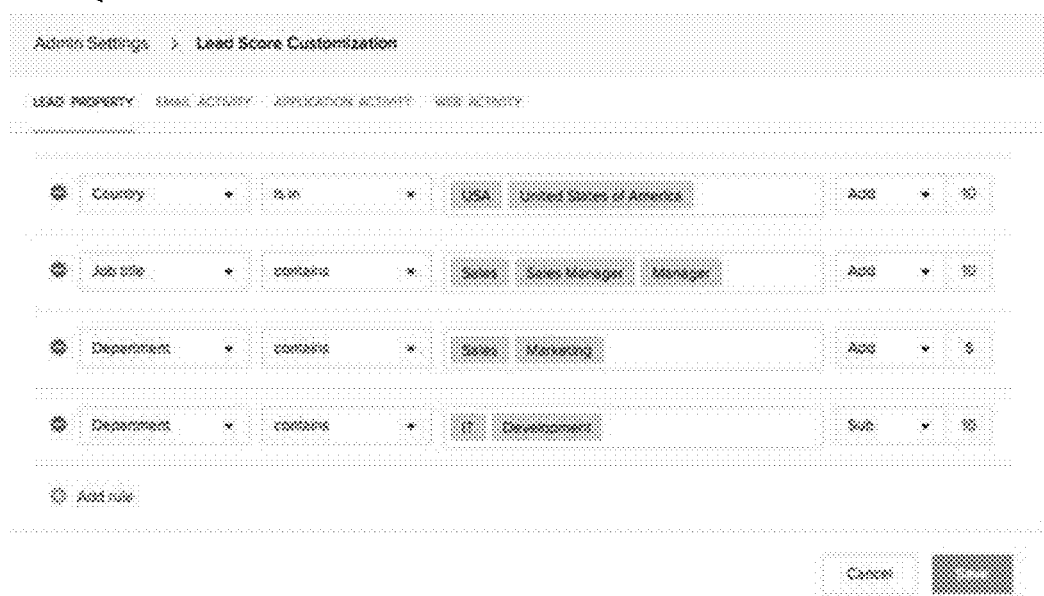
FIG. 3 illustrates a graphical user interface (GUI) for lead score customization based on lead property, according to an embodiment of the present invention.

FIG. 3 illustrates a GUI 300 for lead score customization based on lead property, according to an embodiment of the present invention. In this embodiment, GUI 300 shows that lead scores may be customized according to lead property. Under lead property, all default fields or rules (e.g., job title, geographic location, industry type, deal expected close date, and any custom fields) in the lead form may be configured for leads. For example, positive or negative values may be assigned to one or more of the fields. Additionally, using the '+' or '-' buttons, rules may be added or removed and values may be assigned to the new rules.

Figure 4:
FIG. 4 illustrates a GUI for lead score customization based on email activity, according to an embodiment of the present invention.
Figure 5:
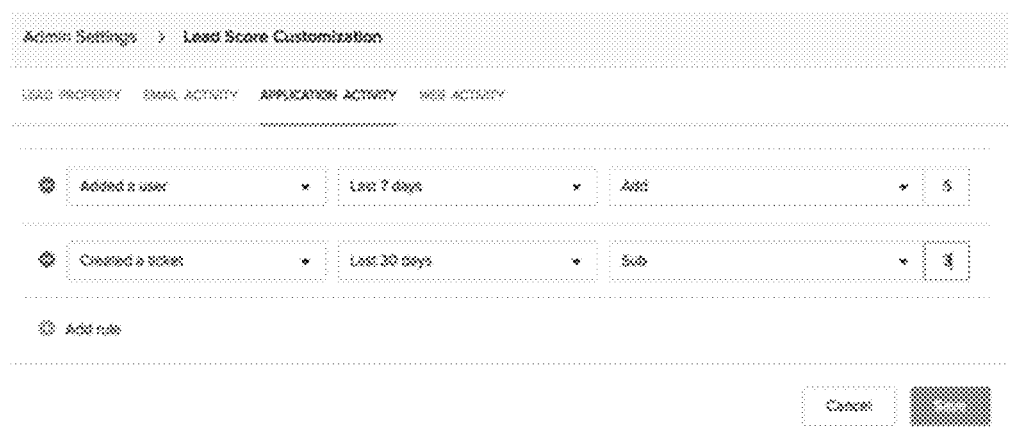
FIG. 5 illustrates a GUI for lead score customization based on application activity, according to an embodiment of the present invention.

FIG. 4 illustrates a GUI 400 for lead score customization based on email activity, according to an embodiment of the present invention. In this embodiment, GUI 400 shows that lead scores may be customized according to email activity. Under email activity, rules may be added or removed using the '+' or '-' buttons and positive or negative values may be assigned to each rule. Rules may include email opened, email responded, time limits taken for various e-mail activities, etc.

FIG. 5 illustrates a GUI 500 for lead score customization based on application activity, according to an embodiment of the present invention. In this embodiment, GUI 500 shows rules for application activity and corresponding positive or negative values for each rule. Application activity may be defined as actions performed on a web application or a website, such as configuring a feature on the website, downloading a brochure, signing up for a webinar and the like. Additionally, using the '+' or '-' buttons, rules may be added or removed and corresponding values may be assigned to the new rules.

Figure 6:
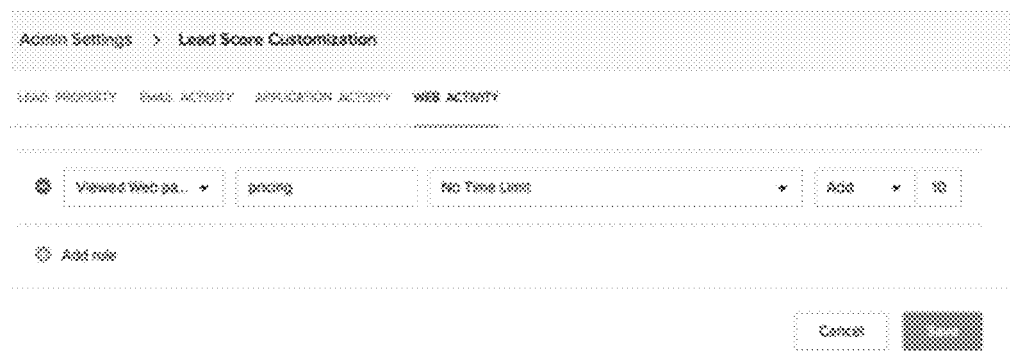
FIG. 6 illustrates a GUI for lead score customization based on web activity, according to an embodiment of the present invention.

FIG. 6 illustrates a GUI 600 for lead score customization based on web activity, according to an embodiment of the present invention. In this embodiment, GUI 600 shows rules for web activity and corresponding positive or negative values for each rule. Web activity may include pages viewed on the company's website such as pricing page, home page, career page, etc. The rules and values for each web activity may be reconfigured. For example, using the '+' or '-' buttons, rules may be added or removed, and corresponding values may be assigned to the new rules.

Figure 7:
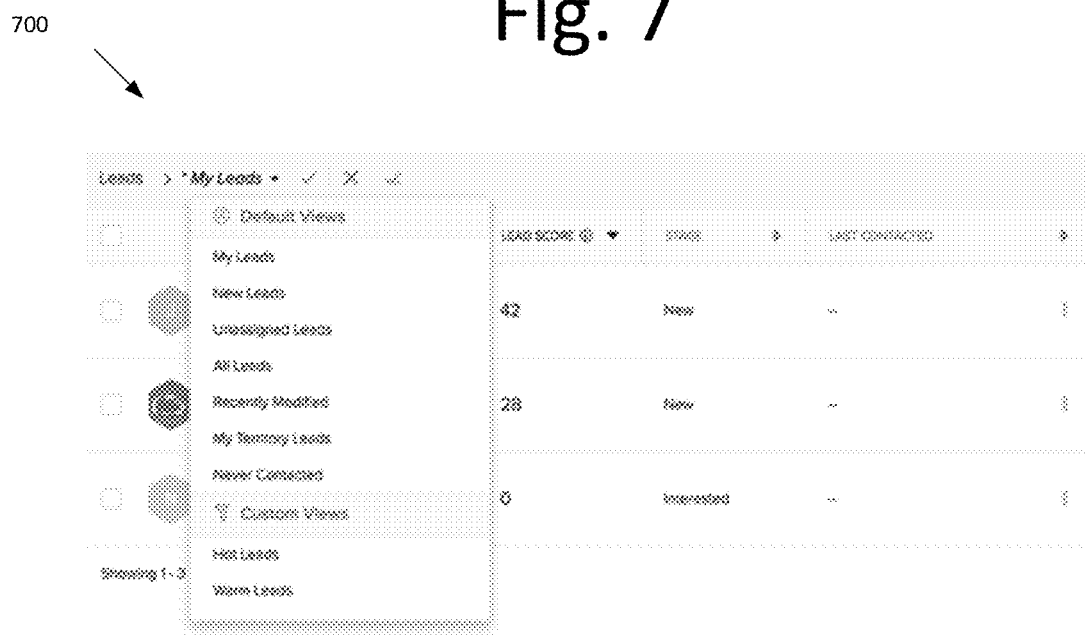
FIG. 7 illustrates a GUI for sorting lead scores, according to an embodiment of the present invention.

FIG. 7 illustrates a GUI 700 for sorting lead scores, according to an embodiment of the present invention. As discussed above, leads may be sorted into different categories, such as hot, warm, and cold, to assist in identifying leads that are most pertinent. Leads may also be sorted based on score, for example.

Figure 8:
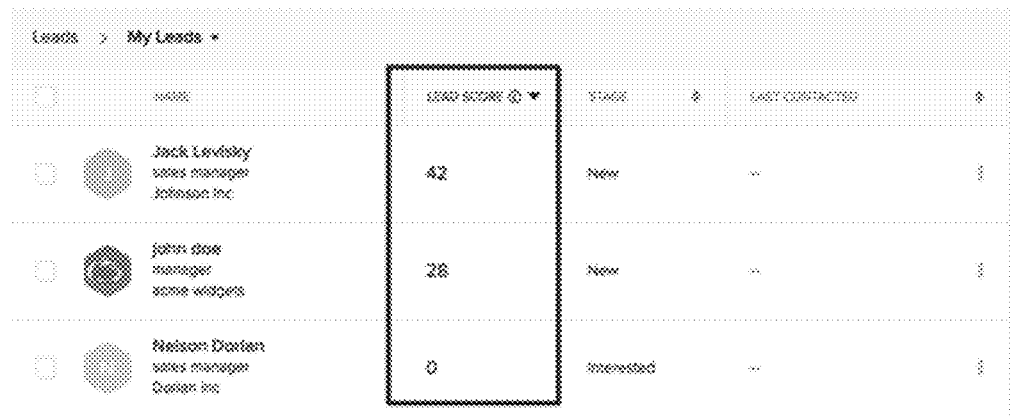
FIG. 8 illustrates a GUI for customizing a view for lead score, according to an embodiment of the present invention.

FIG. 8 illustrates a GUI 800 for customizing a view for lead score, according to an embodiment of the present invention. As discussed above, leads may be filtered based on the lead scores, and those leads that are pertinent may be displayed. By filtering out unwanted leads, the result of the pertinent leads is displayed in addition to lead names making it easier to understand and focus on the pertinent leads.

By default, custom views may be provided based on a lead score for leads and contacts. These views can be edited and/or deleted at any time. As noted above, leads may be classified as hot, warm, or cold. Hot lead may include leads that are most active and most likely to make a purchase, warm leads may include leads that are not sales-ready leads (i.e., less likely to make a purchase), and cold leads may include leads that would have signed up for the product or service, but are not actively engaged with the company. The cold leads may include those that do not open email, rarely visit the website or web application, for example.

Contacts may also be classified under active, inactive, and slipping away. Active contacts may include those that are most active, i.e., to whom you can upsell or cross sell products or services to, inactive contacts may include those that have not visited the website in a long time, and slipping away may include those that have a high score but are not actively engaged for the past seven days.

Figure 9:
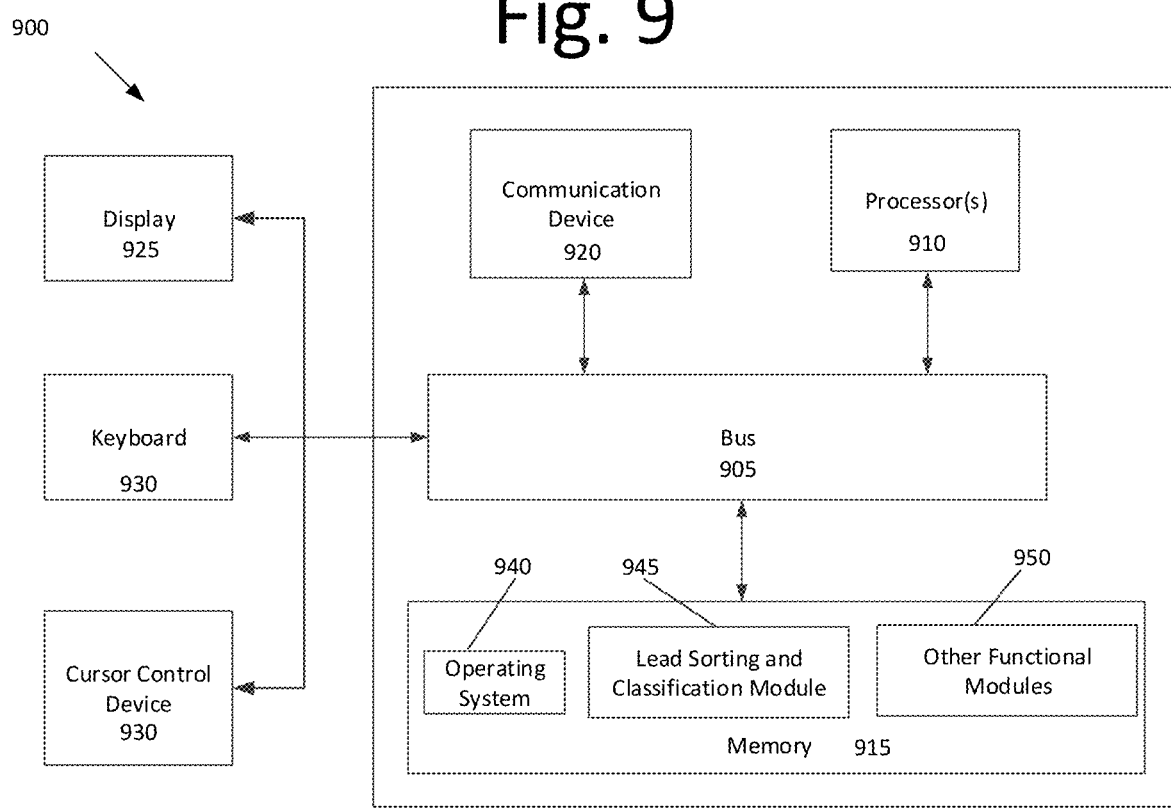
FIG. 9 is a block diagram illustrating a computing system configured classifying leads, according to an embodiment of the present invention.

FIG. 9 is a block diagram illustrating a computing system 900 configured classifying leads, according to an embodiment of the present invention. Computing system 900 includes a bus 905 or other communication mechanism for communicating information, and processor(s) 910 coupled to bus 905 for processing information. Processor(s) 910 may be any type of general or specific purpose processor, including a central processing unit (CPU) or application specific integrated circuit (ASIC). Processor(s) 910 may also have multiple processing cores, and at least some of the cores may be configured to perform specific functions. Computing system 900 further includes a memory 915 for storing information and instructions to be executed by processor(s) 910. Memory 915 can be comprised of any combination of RAM, read only memory (ROM), flash memory, cache, static storage such as a magnetic or optical disk, or any other types of non-transitory computer-readable media or combinations thereof. Additionally, computing system 900 includes a communication device 920, such as a transceiver and antenna, to wirelessly provide access to a communications network.

Non-transitory computer-readable media may be any available media that can be accessed by processor(s) 910 and may include both volatile and non-volatile media, removable and non-removable media, and communication media. Communication media may include computer-readable instructions, data structures, program modules or other data in a modulated data signal such as a carrier wave or other transport mechanism and includes any information delivery media.

Processor(s) 910 are further coupled via bus 905 to a display 925, such as a Liquid Crystal Display (LCD), for displaying information to a user. A keyboard 930 and a cursor control device 935, such as a computer mouse, are further coupled to bus 905 to enable a user to interface with computing system. However, in certain embodiments such as those for mobile computing implementations, a physical keyboard and mouse may not be present, and the user may interact with the device solely through display 925 and/or a touchpad (not shown). Any type and combination of input devices may be used as a matter of design choice.

Memory 915 stores software modules that provide functionality when executed by processor(s) 910. The modules include an operating system 940 for computing system 900.

The modules further include a lead sorting and classification module 945 that is configured to perform sorting and classification of leads in accordance with the embodiments discussed herein. Computing system 900 may include one or more additional functional modules 950 that include additional functionality.

One skilled in the art will appreciate that a "system" could be embodied as an embedded computing system, a personal computer, a server, a console, a personal digital assistant (PDA), a cell phone, a tablet computing device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, RAM, tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The process steps performed in FIG. 1 may be performed by a computer program, encoding instructions for the non-linear adaptive processor to perform at least the processes described in FIG. 1, in accordance with embodiments of the present invention. The computer program may be embodied on a non-transitory computer-readable medium. The computer-readable medium may be, but is not limited to, a hard disk drive, a flash device, RAM, a tape, or any other such medium used to store data. The computer program may include encoded instructions for controlling the nonlinear adaptive processor to implement the processes described in FIG. 1, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an ASIC.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer program embodied on a non-transitory computer-readable medium, the computer program configured to cause at least one processor to:
   access a lead comprising a set of lead data fields comprising a lead profile and a lead engagement level;
   enrich the lead by:
      accessing one or more external services via one or more application programming interfaces (APIs);
      retrieving lead data associated with the lead profile or the lead engagement level;
      updating the set of lead data fields with the retrieved lead data;
   store the enriched lead in cache to reduce the need to query a database and improve execution when adjusting a lead score;
   detect an event associated with the enriched lead in a webpage or an application;
   in response to detecting the event associated with the enriched lead:
      access implicit lead scoring rules written into an application code executable by one of an application server or a queue server;
      access explicit lead scoring rules stored on a database and executable by one of the application server or the queue server; and
      access the cached enriched lead;
   adjust the lead score by comparing the event with the implicit lead scoring rules, the explicit lead scoring rules, the cached enriched lead, or any combination thereof, improving execution of lead score adjustment; and
   assign the enriched lead to a category or classification by using the adjusted lead score for purposes of identifying a positive or negative lead.

2. The computer program of claim 1, wherein the event comprises one or more user initiated activities that impact the lead score.

3. The computer program of claim 1, wherein the explicit lead scoring rules comprise of one or more rules defined by one or more users.

4. The computer program of claim 1, wherein the implicit lead scoring rules comprise of one or more predefined rules not accessible by one or more users for modification.

5. The computer program of claim 1, wherein the computer program is further configured to cause the at least one processor to filter negative leads from the purview of one or more users.

6. The computer program of claim 1, wherein the computer program is further configured to cause the at least one processor to display a customized view of the positive lead based on the assigned lead.

7. The computer program of claim 1, wherein the computer program is further configured to classify one or more leads as a hot lead, a cold lead, or a warm lead, increasing probability of converting the one or more leads.

8. The computer program of claim 1, wherein the computer program is further configured to classify one or more contacts within the lead as active contacts, inactive contacts, or slipping away contacts.

9. A computer-implemented method, comprising:
   by a computer system, accessing a lead comprising a set of lead data fields comprising a lead profile and a lead engagement level;
   by the computer system, enriching the lead by:
      accessing one or more external services via one or more application programming interfaces (APIs);
      retrieving lead data associated with the lead profile or the lead engagement level;
      updating the set of lead data fields with the retrieved lead data;
   storing the enriched lead in cache to reduce the need to query a database and improve execution when adjusting a lead score;
   by the computer system, detecting an event associated with the enriched lead in a webpage or an application;
   in response to detecting the event associated with the enriched lead, by the computer system:
      accessing implicit lead scoring rules written into an application code executable by one of an application server or a queue server;
      accessing explicit lead scoring rules stored on a database and executable by one of the application server or the queue server;
      accessing the cached enriched lead;
   by the computer system, adjusting the lead score by comparing the event with the implicit lead scoring rules, the explicit lead scoring rules, the cached enriched lead, or any combination thereof, improving execution of lead score adjustment; and
   by the computer system, assigning the enriched lead to a category or classification by using the adjusted lead score for purposes of identifying a positive or negative lead.

10. The computer-implemented method of claim 9, wherein the event comprises one or more user initiated activities that impact the lead score.

11. The computer-implemented method of claim 9, wherein the explicit lead scoring rules comprise of one or more rules defined by one or more users.

12. The computer-implemented method of claim 9, wherein the implicit lead scoring rules comprise of one or more predefined rules not accessible by one or more users for modification.

13. The computer-implemented method of claim 9, further comprising:
   by the computer system, filtering negative leads from the purview of one or more users.

14. The computer-implemented method of claim 9, further comprising:
   by the computer system, displaying a customized view of the positive lead based on the assigned lead.

15. The computer-implemented method of claim 9, further comprising:
   by the computer system, classifying one or more leads as a hot lead, a cold lead, or a warm lead, increasing probability of converting the one or more leads.

16. The computer-implemented method of claim 9, wherein the computer program is further configured to classify one or more contacts within the lead as active contacts, inactive contacts, or slipping away contacts.

17. A system, comprising:
   a computer system configured to:
      access a lead comprising a set of lead data fields comprising a lead profile and a lead engagement level;
      enrich the lead by:
         accessing one or more external services via one or more application programming interfaces (APIs);
         retrieving lead data associated with the lead profile or the lead engagement level;
         updating the set of lead data fields with the retrieved lead data;

store the enriched lead in cache to reduce the need to query a database and improve execution when adjusting a lead score;
detect an event associated with the enriched lead in a webpage or an application;
in response to detecting the event associated with the enriched lead:
  access implicit lead scoring rules written into an application code executable by one of an application server or a queue server;
  access explicit lead scoring rules stored on a database and executable by one of the application server or the queue server;
  access the cached enriched lead;
adjust the lead score by comparing the event with the implicit lead scoring rules, the explicit lead scoring rules, the cached enriched lead, or any combination thereof, improving execution of lead score adjustment; and
  assign the enriched lead to a category or classification by using the adjusted lead score for purposes of identifying a positive or negative lead.

18. The system of claim 17, wherein the computer system is further configured to cause the at least one processor to filter negative leads from the purview of one or more users.

19. The system of claim 17, wherein the computer system is further configured to cause the at least one processor to display a customized view of the positive lead based on the assigned lead.

20. The system of claim 17, wherein the computer system is further configured to classify one or more leads as a hot lead, a cold lead, or a warm lead, increasing probability of converting the one or more leads, or classify one or more contacts within the lead as active contacts, inactive contacts, or slipping away contacts.

* * * * *